United States Patent [19]

Dasgupta

[11] Patent Number: 4,647,380

[45] Date of Patent: Mar. 3, 1987

[54] ANNULAR DUAL MEMBRANE PERMSELECTIVE DEVICE AND METHOD

[76] Inventor: Purnendu K. Dasgupta, 4345 28th St., Apt. #28, Lubbock, Tex. 79410

[21] Appl. No.: 680,931

[22] Filed: Dec. 12, 1984

Related U.S. Application Data

[63] Continuation-in-part of Ser. No. 421,082, Sep. 22, 1982, Pat. No. 4,500,430.

[51] Int. Cl.⁴ ............................................. B01J 47/12
[52] U.S. Cl. .................................. 210/638; 210/656; 210/198.2; 210/321.1
[58] Field of Search .................. 29/456, 505; 210/638, 210/656, 670, 678, 679, 681, 683, 685, 321.1, 483, 487, 497.1, 500.2, 502, 641, 198.2, 198.3; 264/495, 320; 521/27, 29

[56] References Cited

U.S. PATENT DOCUMENTS

| | | | |
|---|---|---|---|
| 3,727,612 | 4/1973 | Sayers et al. | 210/641 |
| 3,839,201 | 10/1974 | Miller | 210/641 |
| 4,045,352 | 8/1977 | Rembaum et al. | 210/500.2 |
| 4,474,664 | 10/1984 | Stevens et al. | 210/656 |

*Primary Examiner*—Ivars Cintins
*Attorney, Agent, or Firm*—Limbach, Limbach & Sutton

[57] ABSTRACT

A permselective assembly for the selective transport of a species of interest across a semipermeable ion, exchange barrier and a method of operating the same are disclosed. The assembly includes an inner tube of a permselective material disposed within the inner volume of an outer tube of a permselective material forming an annular channel therebetween. This annular dual tube arrangement decreased the hold up volume of the outer tube and increases efficiency of transport of the species of interest.

32 Claims, 12 Drawing Figures

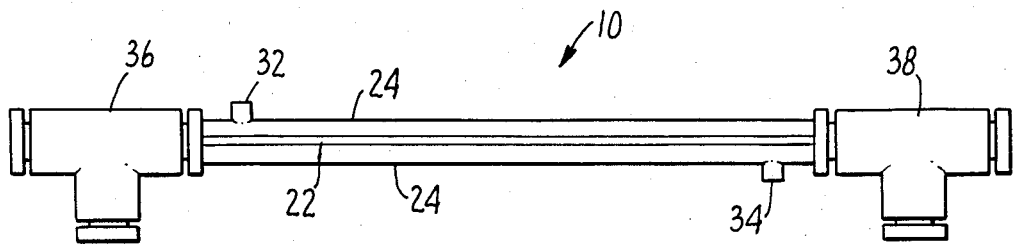
FIG. 1
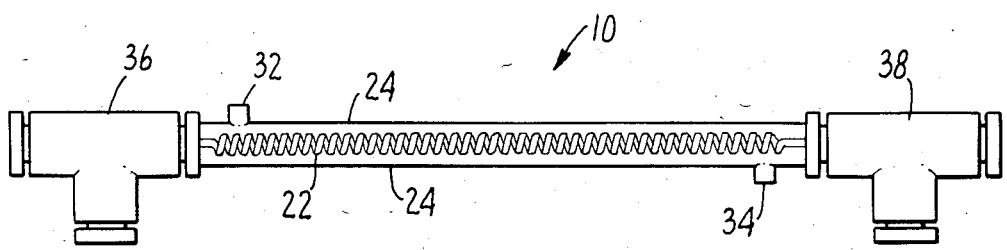
FIG. 2
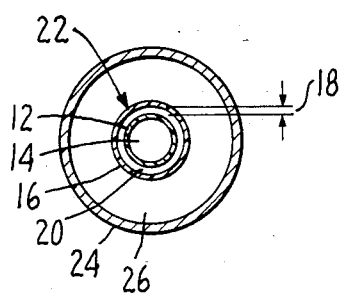 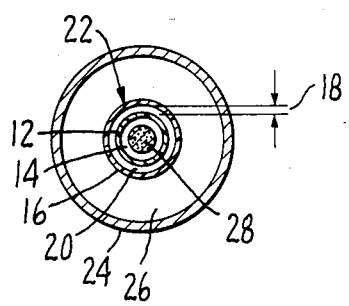
FIG. 3　　FIG. 4

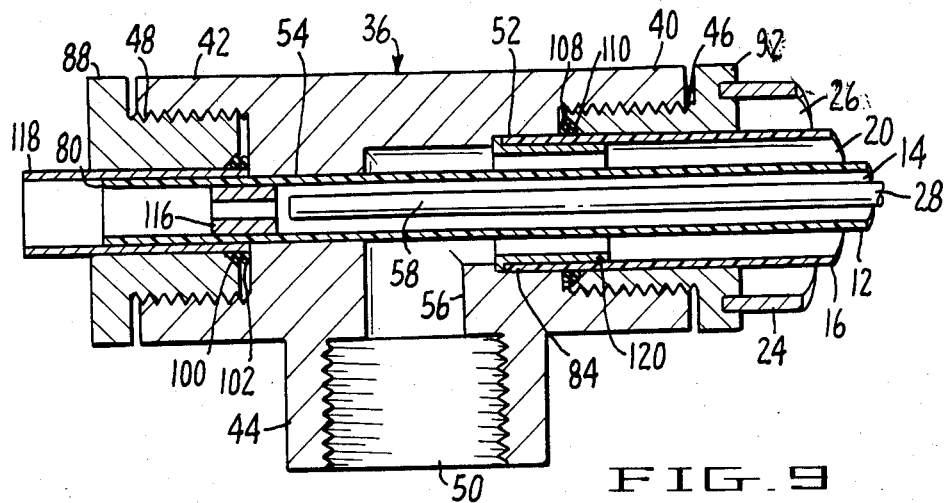
FIG.9
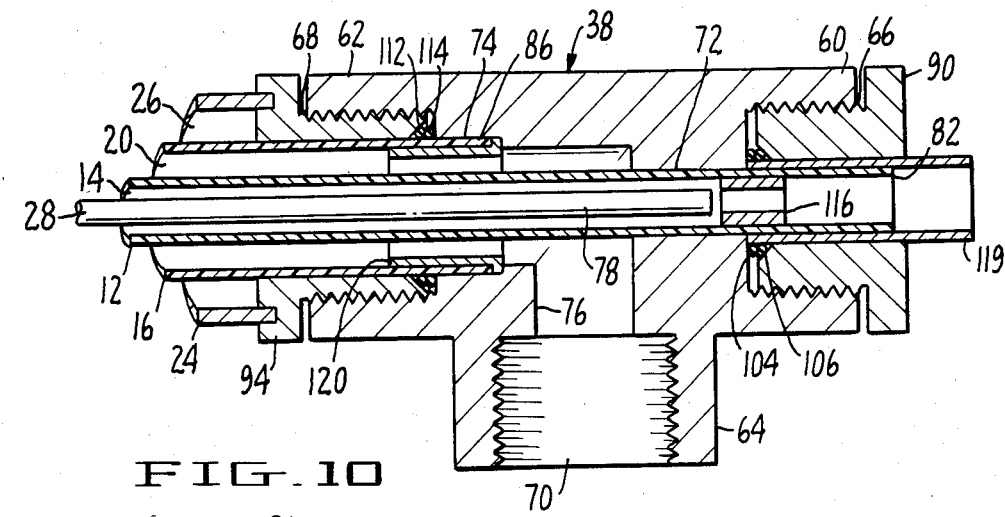
FIG.10
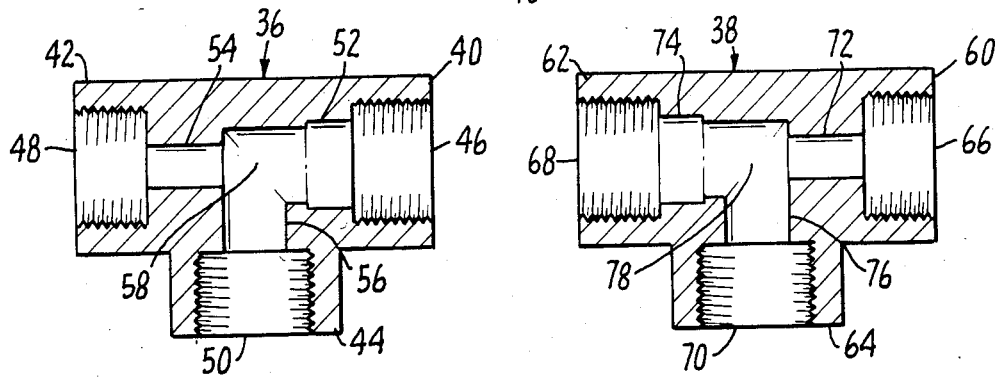
FIG.11
FIG.12

ANNULAR DUAL MEMBRANE PERMSELECTIVE DEVICE AND METHOD

This is a continuation-in-part of my copending U.S. patent application Ser. No. 421,082 filed Sept. 22, 1982 for "Continuously Rejuvenated Ion Exchanger" which issued on Feb. 19, 1985 as U.S. Pat. No. 4,500,430.

TECHNICAL FIELD

The present invention relates generally to a permselective assembly for the selective transport of a species of interest across a semi-permeable ion exchange barrier. More specifically, the present invention relates to an annular dual membrane permselective assembly and a method to operate the same.

BACKGROUND OF THE INVENTION

Permselective devices have proven useful to selectively remove or replace certain substances (species of interest) in a solution. Current use of permselective devices to both recover valuable products and remove harmful materials is widespread in many fields including clinical medicine, analytical and clinical chemistry, and the electrochemical and chemical process industries.

These devices utilize a barrier comprised of a permselective material, typically a membrane, which allows facile permeation, or transport, of certain particles, molecules or ions through the barrier while offering large resistance to the transport of other particles, molecules or ions. The species of interest passes through the membrane barrier at numerous transport sites located on the membrane. Thus, the number of available transport sites on a given membrane barrier may be a limiting factor in the overall rate of transport. This is determined by the type as well as the dimensions of the membrane used in the device. Previously known permselective membranes include cation exchange and anion exchange membranes.

Cation exchange membranes electrostatically resist the passage of anions while permitting the passage of cations at cation exchange sites located on the membrane. Nafion, a commercial cation exchange membrane of E. I. du Pont de Nemours & Co., comprised of a fluorocarbon backbone with pendant sulfonic acid groups as ion exchange sites, has proven a useful membrane for use in the field of ion chromatography.

Anion exchange membranes, on the other hand, electrostatically resist the passage of cations while permitting the passage of anions at anion exchange sites located on the membrane. RAIPORE-ADM, a commercial anion membrane of RAI Research Corp. comprised of radiation-grafted polyethylene-based anion exchanger, has also proven a useful membrane in ionic separation procedures.

Permselective membranes are commonly configured as flat sheet membranes, as in most electrochemical applications, or as hollow fibers, as in haemodialysis devices. In operation, tubular permselective membranes are commonly enclosed within an external jacket, thus creating an assembly having two channels through which solutions may pass: a central channel within the tubular membrane itself and an outer channel between the membrane and the external jacket. Typically, a solution containing the species of interest is passed through the central channel of the membrane tube and a regenerant solution is passed through the outer channel. The species of interest makes contact with the inner surface of the membrane tube and diffuses through the membrane. A regenerant solution containing a species capable of rejuvenating exhausted membrane transport sites is passed through the outer channel. This not only facilitates recovery of the species of interest after it has been removed from its original solution, but also enables the membrane to further transport the species of interest as more solution containing the species of interest passes through the central channel and makes contact with the inner surface of the membrane tube. The flow of solutions through these channels may be accomplished by gravity alone or facilitated with the aid of a pump. In this tubular configuration, the overall efficiency of transport of the species of interest is maximized by minimizing the rate at which the species of interest flows through the central channel and, to a degree, maximizing the rate at which the regenerant solution flows through the outer channel. Thus, the flow rates of both solutions are limiting factors in the overall rate at which transport of the species of interest across the permselective barrier takes place.

The overall efficiency is also dependent, in part, upon the rate of transport of the species of interest through the membrane and the rate of transport to the membrane. The transport rate through the membrane is dependent upon the nature of the membrane and the thickness of the membrane. For any given membrane type, structural considerations limit the degree to which the thickness of the membrane can be reduced. Although thinner membranes facilitate mass transfer through the barrier, they are, however, less able to withstand pressure and run the risk of rupture during operation. Further, the resistivity of all membranes towards the undesirable species (i.e., those which normally should not penetrate the membrane) also decreases with decreasing membrane thickness. Thus, the use of thinner membranes lead to additional considerations in the use of regenerants. For example, penetration of regenerants becomes significant at relatively high regenerant concentrations and with thinner membranes. Regenerant penetration is an even greater threat where the rejuvenating species is of low molecular weight, such as sulfuric acid or sodium hydroxide.

The rate of transport through the membrane is related to the ratio of the number of membrane sites available for transport to the flux of the species of interest. Thus, for a given membrane and a given number of available transport sites, the overall rate of removal is likely to be limited by the rate of mass transport through the membrane where the flux of the species of interest is high. However, where the flux of the species of interest is low, the overall rate of removal is likely to be limited by the rate of transport to the membrane.

In the tubular configuration, the hold up volume, or dead space within the central channel, can be the most significant limiting factor in the rate of transport to the membrane. For a given length of the hollow tubular device, the hold up volume is proportional to the square of the diameter. An increase in the hold up volume decreases the efficiency of transport to the membrane. Although an increase in the length of the tube provides a greater amount of surface area for transport, it is desirable to keep the length to a minimum to avoid increased pressure drops.

The hold up volume must often be kept to an operational minimum for reasons other than mere efficiency of transport. The small hold up volume requirement in ion chromatography arises from the need to minimize the dispersion of an injected sample, to maintain the resolution (minimize overlap between two adjacent sample bands) and sensitivity (minimize dilution of the injected sample).

Since the hold up volume is dependent upon the length and inner diameter of the tube, the overall process is optimized by using membrane tubes of the shortest possible length and the smallest possible inner diameter. However, 100 microns is the current technological lower limit for the inner diameters of hollow membrane tubes. In fact, many commercial membranes either are not or cannot be commercially manufactured even at this diameter.

Previous work has been directed toward improving mass transfer to the walls of a tube by decreasing its hold up volume. One approach has accomplished this objective by filling the tube with inert beads of optimized size as described in Reijn, J. M., et al., Anal. Chim. Acta, 123:229 (1981). These beads act to reduce the hold up volume within a tube and thus increase the transport efficiency to the wall per unit hold up volume. Another approach directed toward decreasing the hold up volume was discussed and disclosed in my copending U.S. patent application Ser. No. 421,082, filed Sept. 22, 1982, now U.S. Pat. No. 4,500,430, and in Dasgupta, P. K., Anal. Chem. 56:96-103 (1984). This approach requires inserting a closely fitting filament inside the tubular membrane such that the liquid flows in the annular space between the filament and the membrane. The filament functions to occupy space within the tube and thus decreases the hold up volume. In the preferred embodiment, the filament filled tube is coiled into a helical configuration having a small helical diameter. The process is most efficient where the diameter of the helix is kept to a minimum.

Both of the above-described approaches greatly reduce the hold up volume of the tubular membrane device compared to its hollow configuration. The filament filled helical configuration has certain additional advantages as described in my copending U.S. application Ser. No. 421,082 and has proven to be a valuable technique to conduct efficient mass transfer to the membrane.

Despite the advancements previously made, there is still a need for an improved permselective device having minimal hold up volume and an increased surface area for transport, particularly to deal with situations where mass transfer through the membrane is the limiting factor. It is thus an object of the present invention to increase the overall rate of transport in a tubular permselective device.

It is a further object of the present invention to provide a perselective device capable of simultaneously removing more than one type of species of interest from a sample.

It is yet another object of the present invention to provide a permselective device capable of simultaneously removing at least one species of interest from two samples.

SUMMARY OF THE INVENTION

A device is provided for reducing the hold up volume in a permselective tubular assembly comprising an outer tube of a permselective material having an inner tube of a permselective material disposed therein forming an annular channel therebetween. A method of operating the assembly of this invention is also disclosed.

BRIEF DESCRIPTION OF THE DRAWINGS

FIG. 1 is a side view of a linear embodiment of the present invention;

FIG. 2 is a side view of a helical embodiment of the present invention;

FIG. 3 is a cross-sectional representation of FIGS. 1 and 2 depicting the arrangement of tubes 12 and 16 within external jacket 24;

FIG. 4 is a cross-sectional representation of FIG. 2 depicting the arrangement of tubes 12 and 16 within external jacket 24 wherein inner tube 12 contains filament 28;

FIG. 9 is an exploded cross-sectional representation of tee fitting 36 of FIG. 2 wherein inner tube 12 contains filament 28;

FIG. 10 is an exploded cross-sectional representation of tee fitting 38 of FIG. 2 wherein inner tube 12 contains filament 28;

FIG. 11 is a cross-sectional representation of tee fitting 36 without its contents illustrating the communication between apertures; and FIG. 12 is a cross-sectional representation of tee fitting 38 without its contents illustrating the communication between apertures.

BEST MODE FOR CARRYING OUT THE INVENTION

Figure 5:
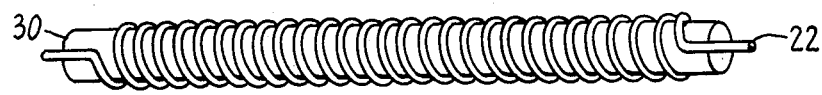
FIG. 5 is an enlarged side view of a helical embodiment of the present invention wherein annular dual tubular assembly 22 is coiled about support rod 30.

The device of the present invention is shown generally as reference numeral 10 in FIGS. 1 and 2 of the accompanying drawings. In accordance with the present invention, the hold up volume in a tubular permselective device may be effectively decreased in a manner heretofore unknown as shown in FIGS. 3 and 4 by inserting an inner tube 12 of a permselective material having a central channel 14 therein within the inner volume of an outer tube 16 of a permselective material forming an annular gap 18 and annular channel 20 therebetween. The entire annular dual tubular assembly 22 is placed within an external jacket 24, which is preferably comprised of an inert material. A device so constructed thus has three separate flow channels: a central channel 14 within inner tube 12 (hereinafter "central channel"); an annular channel 20 between inner tube 12 and outer tube 16 (hereinafter "annular channel"); and an outer channel 26 between outer tube 12 and external jacket 24 (hereinafter "outer channel").

Inner tube 12 functions to reduce the hold up volume within outer tube 16. The device is most effective when inner tube 12 closely fits outer tube 16, i.e., when annular gap 18 is small, preferably less than 1 millimeter, and the hold up volume is correspondingly small. This arrangement of permselective tubes further functions to provide an additional perselective surface area and hence to increase the number of sites available for transport compared to previously known devices. The two tubes, 12 and 16, may or may not be comprised of the same type of permselective material depending on whether the application requires transport of more than one type of species.

Where tubes 12 and 16 are comprised of the same permselective material or materials of similar permselective properties (e.g., both anion exchange or cation exchange membranes), an efficient permselective system is achieved having approximately twice the available sites for the transport of the species of interest as compared to its single tubed counterpart. This arrangement is capable of removing a species of interest from (1) a single sample solution, or (2) two separate sample solutions. In the first example, a sample solution containing the species of interest is passed through the device through annular channel 20 while regenerant solutions are passed through the device through remaining channels 14 and 26. In the second example, the sample solution is passed through outer channel 24 and central channel 14 while the regenerant solution is passed through annular channel 20. The tranport process is most effective where the regenerant solutions are passed through the device countercurrent to the sample solution. A further embodiment of the present invention involves serially connecting those channels through which a sample solution is passed such that the sample is subjected to the process first in one channel then in another. This procedure is especially efficient where the outer channel is serially connected to the central channel and the regenerant solution is passed through the annular channel. In another similar embodiment, the regenerant solution is passed through serially connected outer and central channels while the sample solution is passed through the annular channel. This procedure is convenient where the regenerant solution is costly.

Where tubes 12 and 16 are comprised of permselective materials of different types (e.g., anion-cation, cation-anion membranes), an efficient dual permselective system is achieved. This embodiment is capable of removing two species of interest from (1) a single sample solution, or (2) two separate sample solutions. In the first example, a sample solution containing two different species of interest is passed through annular channel 20 which is bound by an inner tube 12 comprised of a permselective material capable of removing one of the species of interest and an outer tube 16 comprised of a material capable of removing the other species of interest. A first regenerant solution is passed through central channel 14 and a second regenerant solution is passed through outer channel 26. In the second example, a dialysate/regenerant solution is passed through annular channel 20 which is bound by an inner tube 12 comprised of a permselective material capable of removing one of the species of interest and an outer tube 16 comprised of a permselective material capable of removing the other species of interest. A first sample solution containing a first species of interest is passed through central channel 14 and a second sample solution containing a second species of interest is passed through outer channel 26. The regenerant solution should contain species capable of rejuvenating exhausted exchange sites on both membranes.

Penetration of the rejuvenating species through the permselective barrier may in some cases present considerable interference to the practice of the present invention inasmuch as thin-walled membranes are desirable components of the device of the present invention. As discussed hereinabove, the rejuvenating species is most apt to penetrate the tube where the barrier is thin. In this regard, polyvalent rejuvenating species of large size such as polyvalent aromatic ions, polymeric electrolytes and quaternary amonium hydroxide have proven to be very useful in the practice of the present invention. Their penetration across the membrane barrier is hindered due to steric and Donnan exclusion forces because of their size and the magnitude of their charges.

The dual annular assembly 22 of the present invention may be of a substantially linear configuration as shown in FIG. 1. In a preferred embodiment, however, the annular assembly is configured as a helix as shown in FIG. 2. The helical configuration may be maintained by a structural support. Such structural support may take the form of a support rod 30, which is preferably comprised of an inert material (such as plastic or type 316 stainless steel), around which is coiled annular dual tubular assembly 22 as a ribbon-like spiral as shown in FIG. 5. The entire assembly may then be inserted into an external jacket 24. In the above helical device design, however, the surface area of outer tube 16 in contact with support rod 30 is effectively unavailable for mass transfer resulting in inefficient transport.

Figure 6:
FIG. 6 is an enlarged side view of a helical embodiment of the present invention wherein external jacket 24 and annular dual tubular assembly 22 contained therein are coiled about support rod 30.

In another embodiment, the helical configuration is structurally supported by a helically configured external jacket 24 as shown in FIG. 6. Where external jacket 24 is comprised of a substantially rigid material, such as stainless steel, no further structural support is required. However, where additional structural support is desired, external jacket 24 itself, as well as the annular dual tubular assembly 22 contained therein, may be coiled about a support rod 30. The device of this embodiment does not suffer from the disadvantage of the previous embodiment in that only external jacket 24 is in contact with support rod 30. Thus, the entire surface of outer tube 16 is available for mass transfer. As discussed hereinabove, the helical configuration is most effective where the helical diameter is as small as possible. Inasmuch as the allowable diameter of a helix is directly proportional to the diameter of the elongated structure from which it is made (i.e., the external jacket), this arrangement suffers from the disadvantage that the helical diameter is not as small as desirable for maximum efficiency, external jacket 24 necessarily having a diameter larger than that of outer tube 16.

A further and different embodiment is shown in FIG. 4 and involves insertion of a member inside inner tube 12 to provide the desired structural support. Such member may take the form of a filament 28 disposed within central channel 14. The filament filled double tube is then coiled around a rod 30. Depending on the nature of the filament, the coil will maintain its shape even after the rod is removed, either as such (e.g., where the filament is a metal wire), or after mild thermo setting (e.g., where the filament is a synthetic polymer, as described in Dasgupta, P. K., Anal. Chem. 56:96-103 (1984)). This embodiment is most advantageous in that a helix of small diameter may be achieved without loss of tubular surface area from contact with a support rod. It must be emphasized, however, that unlike the work in the above reference, the filament is not chosen to be close fitting since its sole purpose is to maintain the helical configuration. A very closely fitting filament is in fact undesirable since it only increases the pressure drop and thus reduces the life expectancy of the device by increasing the probability of membrane rupture. However, a too loosely fitting filament is also undesirable because fluid pressure in annular channel 20 may cause structural collapse of inner membrane tube 12.

The insertion of a closely fitting membrane tube inside another membrane requires special techniques which are described hereinbelow:

Nafion cation exchanger membrane tubing is commercially available in at least two diameters, 811x (approximately 900 microns in outer diameter) and 815x (approximately 1100 microns in inner diameter). 811x is easily inserted inside 815x as they are commercially available, but the annular gap created by such insertion is too large to effectively decrease the hold up volume of the assembly. A convenient way to reduce the annular gap is to take advantage of the pliability of certain membrane tubing such as Nafion or cellulose acetate when they are solvent-swelled. Nafion swells in most polar organic solvents as well as with steam treatment under greater than atmospheric pressure and becomes very pliable. Thus, the 811x inside the 815x membrane is immersed for a prolonged period in methanol or boiled in ethanol. Subsequently, only the outer 815x membrane is stretched and held in that position until the solvent evaporates. With the evaporation of the solvent, the 815x membrane shrinks and only a small annular gap exists between the two membrane tubes.

Another convenient arrangement involves the insertion of one 811x membrane tube inside another 811x membrane tube. The first piece is solvent-swelled as above and stretched. When this solvent is allowed to evaporate, the new diameter of the tube is smaller than the original diameter. The second tube with the original diameter is then connected to a pump as described in Dasgupta, P. K., Anal. Chem., 56:96–103 (1984), and water is pumped through it. One end of the first membrane tube with smaller diameter is sealed off by heat, a small section of a close fitting filament, or an adhesive. A relatively loose fitting, small diameter filament is then inserted through the open end of the narrower diameter membrane tube. This filament filled membrane is then inserted into an open end of the original diameter membrane tube through which water is flowing. Because the inserted end of the inner membrane tube is closed, water cannot flow through it and must flow through the annular gap between the membrane tubes. The resulting pressure expands the outer membrane tube and aided by the lubrication of the flowing fluid and rigidity of the inserted filament, the filament filled inner membrane tube can be inserted through the length of the outer membrane tube with ease.

Membrane tubing such as those made by radiation grafting of other types of groups on a polyfluorocarbon backbone (e.g., those made by RAI Research Corp.) do not appreciably swell by solvents. Such tubing can be stretched by heating them with simultaneous application of elongatory stress. A convenient arrangement to practice this is to affix one end of the tubing in a vertical configuration while a suitable weight is attached to the other end. A heat gun is then moved along the length of the tubing. The resulting treated tubing is of smaller diameter than its original form. Thus, the treated tubing may be inserted into the inner volume of such untreated tubing. Nafion and other membrane tubing are also amenable to this process.

Once one membrane tube is inserted inside the other, the hold up volume of the channel(s) through which the sample solution(s) pass may be further reduced. This may be accomplished by intentionally applying back pressure to the regenerant solution(s). For example, where the sample solution is passed through the device through the annular channel, the hold up volume of the annular channel may be reduced by applying back pressure to the flow of regenerant solution(s) flowing through the central channel or outer channel or both. Internal pressure within the central channel radially expands inner tube 12 while pressure within the outer channel radially compresses outer tube 16 and thus reduces the annular gap between the two tubes and hence the hold up volume of the annular channel. Where sample solution(s) are passed through the device through the central and the outer channels, their hold up volumes may be reduced by applying back pressure to the flow of regenerant solution flowing through the annular channel. In this case, pressure within the annular channel radially compresses inner tube 12 and radially expands outer tube 16 and thus simultaneously reduces the hold-up volume of the central and outer channels. In either of these two examples, the central and outer channels may be serially connected where the solutions flowing through these channels are the same.

In a preferred embodiment, separate access apertures are provided for channels 14, 20 and 24. As shown in FIGS. 1 and 2, external jacket 24 has apertures 32 and 34 near its opposite ends to provide separate access for outer channel 26. Tee fittings 36 and 38, attached at opposite ends of the device, provide separate access apertures for central channel 14 and annular channel 20.

As shown in FIGS. 7, 8, 9 and 10, tee fittings 36 and 38 are mirror images of one another. Tee fitting 36 has three hollow arms 40, 42 and 44 and apertures 46, 48 and 50 at the ends of each of the respective arms. As shown in FIGS. 11 and 12, tee apertures 46, 48 and 50 communicate with one another through tee channels 52, 54 and 56 which radiate from a central point 58. Similarly, tee fitting 38 has three hollow arms 60, 62 and 64 and apertures 66, 68 and 70 at the ends of each of the respective arms. Apertures 66, 68 and 70 communicate with one another through tee channels 72, 74 and 76 which radiate from a central point 78. In this embodiment, the length of inner tube 12 is greater than the length of outer tube 16 within which it is disposed such that ends 80 and 82 of inner tube 12 are not enclosed within outer tube 16. Further, the length of outer tube 16 is less than the length of external jacket 24 such that ends 84 and 86 of outer tube 16 are not enclosed within external jacket 24.

Figure 7:
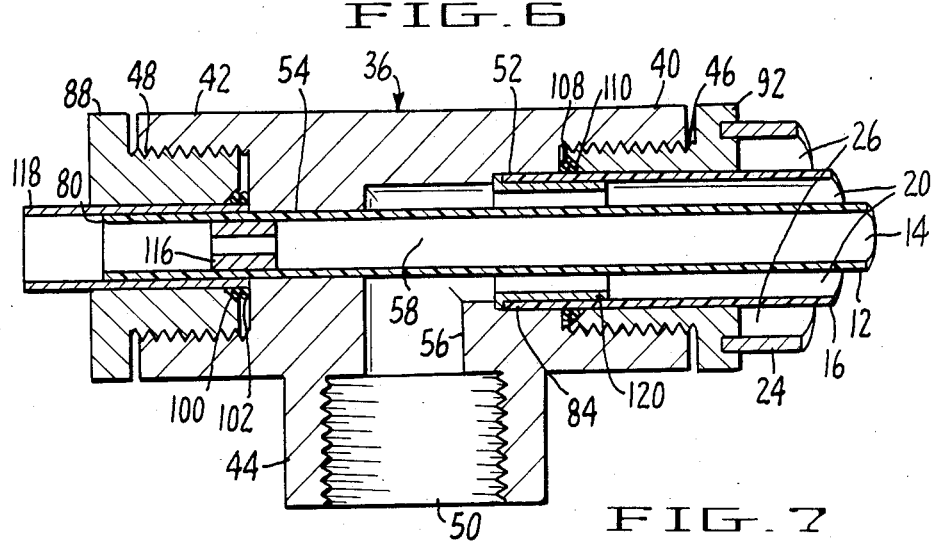
FIG. 7 is an exploded cross-sectional representation of tee fitting 36 of FIGS. 1 and 2.
Figure 8:
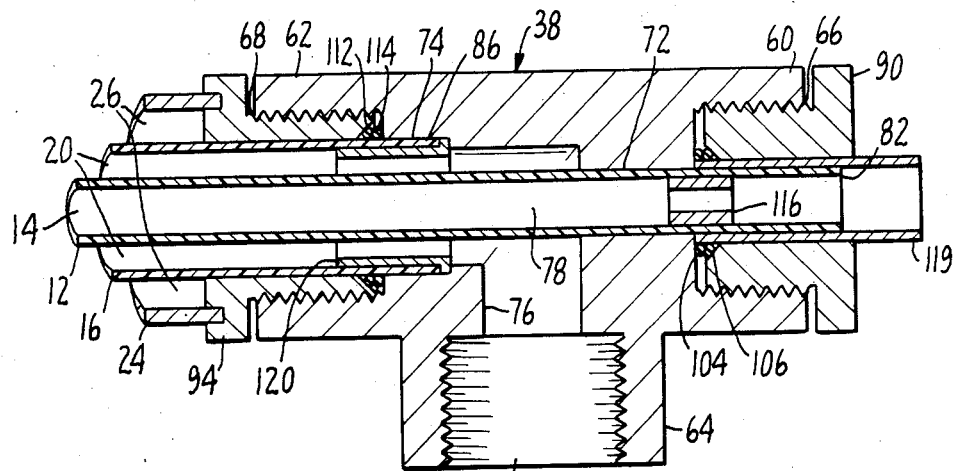
FIG. 8 is an exploded cross-sectional representation of tee fitting 38 of FIGS. 1 and 2.

As shown in FIGS. 7 and 9, outer tube 16 and inner tube 12 contained therein are disposed within tee fitting 36 such that end 84 of outer tube 16 extends to at least a portion of the hollow of tee arm 40, forming a fluid-tight seal between outer tube end 84 and the inner walls of tee arm 40. Inner tube 12 extends beyond said seal, past central point 58 and tee channel 54 and up to at least a portion of the hollow of tee arm 42, forming a fluid-tight seal between inner tube end 80 and the inner walls of arm 42. Referring to FIGS. 8 and 10, outer tube 16 and inner tube 12 contained therein are disposed within tee fitting 38 such that end 86 of outer tube 16 extends to at least a portion of the hollow of tee arm 62, forming a fluid-tight seal between outer tube end 86 and the inner walls of arm 62. Inner tube 12 extends beyond said seal, past central point 78 and tee channel 72 and up to at least a portion of the hollow of tee arm 60, forming a fluid-tight seal between inner tube end 82 and the inner walls of arm 60. In the case of the filament-filled embodiment, filament 28 should extend into tee fittings 36 and 38 just short of inner tube ends 80 and 82.

In this arrangement of tube ends inserted into tee fittings, central channel 14 is only in communication with apertures 48 and 66 of tee fittings 36 and 38, respectively, because of the fluid-tight seals at ends 80 and 82 of inner tube 12. Similarly, annular channel 20 is only in communication with apertures 50 and 70 of tee fittings 36 and 38, respectively, because of the fluid-tight seals at ends 84 and 86 of outer tube 16 and at ends 80 and 82 of inner tube 12. Thus, apertures 50 and 70 serve as access apertures for annular channel 20 and apertures 48 and 66 serve as access apertures for central channel 14.

As shown in FIGS. 7, 8, 9 and 10, the fluid tight seals at ends 80 and 82 of inner tube 12 may be formed with the use of hollow male thread nut 88 inserted within arm 42 of tee fitting 36 and hollow male thread nut 90 inserted within arm 60 of tee fitting 38. In operation, ends 80 and 82 are disposed within the hollow portions of male thread nuts 88 and 90, respectively. The fluid tight seals at ends 84 and 86 of outer tube 16 may be formed with the use of hollow male thread nut 92 inserted within arm 40 of tee fitting 36 and hollow male thread nut 94 inserted with arm 62 of tee fitting 38. In operation, ends 80 and 82 are disposed within the hollow portions of male thread nuts 88 and 90, respectively, and ends 84 and 86 are disposed within the hollow portions of male thread nuts 92 and 94, respectively. In this embodiment, the outer configuration of each hollow male thread nut should be complimentary to that of the inner portion of the arm into within which each is disposed such as to fit snugly and tightly within its respective arm.

In order to ensure that central channel 14 does not collapse, a small segment of a tube 116 having an outer diameter slightly less than the inner diameter of inner tube 12 is placed within central channel 14 and about ends 80 and 82 of inner tube 12. In the filament filled embodiment, tube 116 should have an inner diameter less than the diameter of filament 28 which is disposed therein such that the filament cannot come out of the ends of the assembly. To facilitate access to central channel 14, inlet tubes 118 and 119 may respectively be disposed within hollow male thread nuts 88 and 90 and about inner tube 12 such as to contact the outer surface of ends 80 and 82 and the inner circumference of the hollow male thread nuts. Male thread nuts 88 and 90 should further be configured such that each fits snugly and tightly about the ends of inlet tubes 118 and 119, respectively.

To aid in the formation of the fluid tight seals, a pair of "O" rings 100 and 102 comprised of a resilient material such as a synthetic rubber may be placed about the external circumference of the end of inlet tube 118 and between male thread nut 88 and the opening into tee channel 54 of tee fitting 36. Another pair of "O" rings 104 and 106 may also be placed about the external circumference of the other end of inlet tube 118 and between male thread nut 90 and the opening of channel 72 of tee fitting 38. Flanging the ends of tube 118 will further improve the sealing at higher pressures.

Similarly, structural support may be provided for annular channel 20 by placing flanged tube 120 having an outer diameter slightly less than the inner diameter of outer tube 16 at ends 84 and 86 of outer tube 16. "O" rings 108 and 110 may be placed about the external circumference of end 84 of outer tube 16 and between male thread nut 92 and the opening of tee channel 52 of tee fitting 36. "O" rings 112 and 114 may be placed about the external circumference of end 86 of outer tube 16 and between male thread nut 94 and the opening of tee channel 52 of tee fitting 38. The fluid tight seals are formed by threading permselective tubes 12 and 16 through the hollow portions of their respective male thread nuts and "O" rings and each male thread nut is securely inserted into each of their respective tee fitting arms. Male thread nuts 92 and 94 should be configured such that each fits snugly and tightly about ends 84 and 86 of outer tube 16. The ends 96 and 98 of male thread nuts 92 and 94 should be designed such that it is convenient to attach external jacket 24 thereto.

In these embodiments, tubes 116, 118 and 120 should be comprised of a substance capable of supporting the integrity of the channels such as polytetrafluoroethylene or stainless steel.

EXPERIMENTAL

1. Application as an ion chromatographic suppressor

A dual membrane filament filled helix suppressor made from two 50 cm lengths of Nafion 811x as described hereinabove and as shown in FIG. 4 was connected to tee fittings as described hereinabove as shown in FIG. 2. The fluid hold up volume of the device so constructed was less than 100 microliters. The device was able to completely ion exchange eluents such as 3 mM $NaHCO_3$ and 2.4 mM $Na_2CO_3$ at flow rates of 3 ml/min.

The characteristics of the regenerant solution was of particular importance in this situation as stretched Nafion 811x is a relatively thin walled membrane. Considering that the penetration of the rejuvenating species through the membrane is deterred not only by its size, but by the Donnan barrier effects which increase with increasing charge of the rejuvenating species, naphthalene disulfonic acid was used as the regenerant with excellent results. The anion in this case is not only large but bears two negative charges and is therefore subject to very strong Donnan exclusion forces as well as steric forces.

The band dispersion characteristics of the above device were sufficiently good such that no discernable difference due to the presence of the supressor was noticeable on peak height and peak width as measured on a Dionex 2000i chromatography system with high performance (Dionex AS4) columns.

2. Application as a continuous deionizer

A 28 gauge nichrome filament was inserted inside an anion exchange membrane tube (of RAI Research Corp.) having an inner diameter of 1 millimeter and a wall thickness of 50 microns. The anion exchange membrane and it filament contents were then inserted inside a Nafion 815x cation exchange membrane tube as shown in FIGS. 2 and 4. The entire assembly was then coiled on a support and retained the helical shape upon removal of the support. Water resistivity greater than 10 MΩ.cm was produced from tap water (greater than 1,000 ppm total dissolved solids) using naphthalene disulfonic acid as the outer regenerant and tetrapropylammonium hydroxide as the anionic regenerant. Use of quarternary ammonium compounds with large cations as regenerants allowed for use of very thin-walled membrane tubes.

As is apparent, the device and method of the present invention has vast applications in many fields, some of which have been disclosed and detailed hereinabove.

Although the foregoing invention has been described in some detail by way of illustration and example for purposes of clarity of understanding, it will be obvious that certain changes and modifications may be practiced within the scope of the appended claims.

I claim:

1. A permselective assembly comprising:
   (a) an outer tube comprised of a permselective material;
   (b) an inner tube defining a central channel comprised of a permselective material concentrically disposed within said outer tube forming an annular gap and an annular channel therebetween; and
   (c) an external jacket comprised of a substantially nonpermeable material enclosing at least an intermediate length of said outer tube and defining an outer channel therebetween, said jacket having a fluid inlet and a fluid outlet.

2. An assembly according to claim 1 wherein said outer and inner tubes are of a substantially linear configuration.

3. An assembly according to claim 1 wherein said inner and outer tubes have a helical configuration.

4. An assembly according to claim 3 wherein said helical configuration is maintained by a structural support.

5. An assembly according to claim 4 wherein a filament having a diameter substantially smaller than the diameter of said central channel is disposed within said inner tube.

6. An assembly according to claim 1 wherein said annular gap is less than 1 millimeter.

7. An assembly according to claim 1 wherein said permselective material of one of said tubes comprises an anion exchange membrane and said permselective material of said other tube comprises a cation exchange membrane.

8. An assembly according to claim 1 wherein said permselective material of both tubes are cation exchange membranes.

9. An assembly according to claim 1 wherein said permselective material of both tubes are anion exchange membranes.

10. An assembly according to claim 1 further comprising means for radially compressing said annular channel.

11. An assembly according to claim 1 further comprising means for radially expanding said annular channel.

12. A method for operating a permselective assembly comprising the steps of:
    (a) providing a permselective assembly as defined in claim 1;
    (b) passing a first solution through said central channel of said assembly;
    (c) passing a second solution through the annular channel of said assembly; and
    (d) passing a third solution through the outer channel of said assembly.

13. A method according to claim 12 wherein said annular gap of said annular channel is less than one millimeter.

14. A method according to claim 12 wherein said annular channel is substantially linear.

15. A method according to claim 12 wherein said annular channel has a substantially helical configuration.

16. A method according to claim 15 wherein said helical configuration is maintained by a structural support.

17. A method according to claim 16 wherein said structural support comprises a filament having a diameter substantially smaller than the diameter of said central channel disposed within said central channel.

18. A method according to claim 12 wherein said permselective material of one of said tubes comprises an anion exchange membrane and the permselective material of the other tube comprises a cation exchange membrane.

19. A method according to claim 12 wherein said permselective material of both tubes are cation ion-exchange membranes.

20. A method according to claim 12 wherein said permselective material of both tubes are anion exchange membranes.

21. A method according to claim 12 wherein:
    (a) said first solution comprises a first regenerant solution;
    (b) said second solution contains at least one substance of interest; and
    (c) said third solution comprises a second regenerant solution.

22. A method according to claim 21 wherein said first regenerant solution contains polyvalent aromatic ions.

23. A method according to claim 21 wherein said first regenerant solution contains polymeric electrolytes.

24. A method according to claim 21 wherein said second regenerant solution contains polyvalent aromatic ions.

25. A method according to claim 21 wherein said second regenerant solution contains polymeric electrolytes.

26. A method according to claim 21 further comprising applying pressure to at least one of said first solution or said third solution sufficient to radially compress said annular channel.

27. A method according to claim 12 wherein:
    (a) said first solution contains a first substance of interest;
    (b) said second solution comprises a regenerant solution; and
    (c) said third solution contains a second substance of interest.

28. A method according to claim 27 wherein said regenerant solution contains polyvalent aromatic ions.

29. A method according to claim 27 wherein said regenerant solution contains polymeric electrolytes.

30. A method according to claim 27 further comprising applying pressure to said second solution sufficient to radially expand said annular channel.

31. A method according to claim 12 wherein said first and third solutions are the same.

32. A method according to claim 31 wherein said outer channel and said central channel are serially connected.

* * * * *